(12) United States Patent
Botti

(10) Patent No.: US 7,047,909 B1
(45) Date of Patent: May 23, 2006

(54) METHODS OF OPERATING A COMPRESSION IGNITION ENGINE AND A VEHICLE SYSTEM

(75) Inventor: Jean J Botti, Rochester Hills, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 11/040,233

(22) Filed: Jan. 21, 2005

(51) Int. Cl.
*F02B 75/12* (2006.01)

(52) U.S. Cl. ............................ 123/1 A; 123/3; 123/304

(58) Field of Classification Search ................ 123/304, 123/1 A, 3, DIG. 12
See application file for complete search history.

(56) References Cited

U.S. PATENT DOCUMENTS

| | | | |
|---|---|---|---|
| 6,427,660 B1 | 8/2002 | Yang ............................ | 123/304 |
| 6,655,130 B1 | 12/2003 | Kirwan et al. | |
| 6,745,744 B1 | 6/2004 | Suckewer et al. | |
| 6,761,325 B1 | 7/2004 | Baker et al. ............. | 239/533.3 |
| 2004/0154581 A1* | 8/2004 | Yamaoka et al. ........... | 123/299 |
| 2004/0194775 A1 | 10/2004 | Shiraishi et al. ............ | 123/295 |

OTHER PUBLICATIONS

Tsolakis, et al. "Exhaust Gas Fuel Reforming for Diesel Engines-A Way to Reduce Smoke and NOx Emissions Simultaneously". School of Engineering, The University of Birmingham 2004-01-1844 (13 pages).
SAE Paper 2001-01-1805 "Effects of Injection Changes on Efficiency and Emission of a Diesel Engine Fueled by Direct Injection of Natural Gas" Silviu Dumitrescu et al.
SAE Paper 2002-01-1630 "Direct Injection of Natural Gas in a Heavy-Duty Diesel Engine" James Harrington et al.
SAE Paper 2002-01-1158 "Modeling the Effects of Late Cycle Oxygen Enrichment on Diesel Engine Combustion and Emissions" D.K. Mather et al.
SAE Paper 920467 "Reduction of Smoke and NOx by Strong Turbulence Generated During the Combustion Process in D.I. Diesel Engines" Mitsuru Konno et al.
Mechanical Engineering Power, "Cleaner Diesels—Tests at Argonne National Laboratory, escaping a classic tradeoff in emissions, simultaneously reduce particulates and NOx", John DeGaspari, http://www.memagazine.org/supparch/mepower99/cleaner/cleaner.html, 6 pages, May 31, 2005.
"Late-Cycle Injection of Air/Oxygen-Enriched Alr to Reduce Diesel Exhaust Emissions", http://www/transportation.anl.gov/pdfs/EE/286.pdf, 1 page, May 31, 2005.
U.S. Appl. No. 11/290,909, filed Nov. 30, 2005, Applicant: Quader et al., "Methods for Operating a Compression Ignition Engine", 15 pages.

* cited by examiner

*Primary Examiner*—Tony M. Argenbright
*Assistant Examiner*—Katrina B Harris
(74) *Attorney, Agent, or Firm*—Jimmy L. Funke

(57) ABSTRACT

A method of operating a compression ignition engine comprises introducing enriching component to a combustion chamber of the compression ignition engine, wherein the enriching component comprises hydrogen, carbon monoxide, or a combination comprising at least one of the foregoing; introducing bulk fuel to the combustion chamber; heating a glow plug to cause the enriching component to release thermal energy; and initiating combustion of the bulk fuel with the released thermal energy from the enriching component.

17 Claims, 1 Drawing Sheet

METHODS OF OPERATING A COMPRESSION IGNITION ENGINE AND A VEHICLE SYSTEM

BACKGROUND

Federal and state governments have enacted progressive laws and regulations that impose ever-increasing restrictions on motor vehicles in the areas of exhaust emissions and improved fuel economy. For example, the California regulations include Super Ultra Low Emission Vehicle (SULEV) emission standards. It is noted that SULEV emission standards are particularly more stringent on hydrocarbon (HC) and nitrogen oxides ($NO_x$) emissions. Moreover, as this trend of increasingly restrictive emissions continues, Zero Emission Vehicle (ZEV) standards are eventually going to become the standard for exhaust gaseous emissions.

Transportation engine systems (compression ignition engines, and the like) for vehicle systems (e.g., passenger cars, trucks, and the like) can draw significant emissions benefits from fuel enrichment with hydrogen and/or carbon monoxide. More particularly, hydrogen- and/or carbon monoxide-enriched fuels can promote rapid catalyst heating to improve exhaust catalyst light-off time, thereby reducing hydrocarbon and $NO_x$ emission, and the like. Moreover, it is noted that hydrogen- and/or carbon monoxide-enriched fuel can cause an engine to operate cleaner under various steady state and transient operating conditions via the control of the fuel mixture, timing, and other combustion parameters, thus promoting more complete and cleaner combustion compared to an engine operating with non-hydrogen enriched and/or non-carbon monoxide enriched fuels.

What is need in the art are methods of operating a compression ignition engine and vehicle system that can result in cleaner exhaust.

SUMMARY

Disclosed herein are methods of operating a compression ignition engine and vehicle system.

One embodiment of a method of operating a compression ignition engine comprises introducing enriching component to a combustion chamber of the compression ignition engine, wherein the enriching component comprises hydrogen, carbon monoxide, or a combination comprising at least one of the foregoing; introducing bulk fuel to the combustion chamber; heating a glow plug to cause the enriching component to release thermal energy; and initiating combustion of the bulk fuel with the released thermal energy from the enriching component.

Another embodiment of a method of operating a compression ignition engine comprises directly-injecting an enriching component to a combustion chamber of the compression ignition engine, wherein the enriching component comprises hydrogen, carbon monoxide, or a combination comprising at least one of the foregoing; directly-injecting a bulk fuel to the combustion chamber; releasing thermal energy from the enriching component with an ignition device; and initiating combustion of the bulk fuel with the released thermal energy from the enriching component.

One embodiment of a method of operating a vehicle system comprises generating reformate in an on-board reformer, wherein the reformate comprises an enriching component, wherein the enriching component comprises hydrogen, carbon monoxide, or a combination comprising at least one of the foregoing; introducing the reformate to a combustion chamber of the compression ignition engine; introducing bulk fuel to the combustion chamber; heating a glow plug to cause the enriching component to release thermal energy; and initiating combustion of the bulk fuel with the released thermal energy from the enriching component.

The above-described and other features will be appreciated and understood by those skilled in the art from the following detailed description, drawings, and appended claims.

BRIEF DESCRIPTION OF THE DRAWINGS

Refer now to the FIGURE, which is an exemplary embodiment.

DETAILED DESCRIPTION

Figure 1:
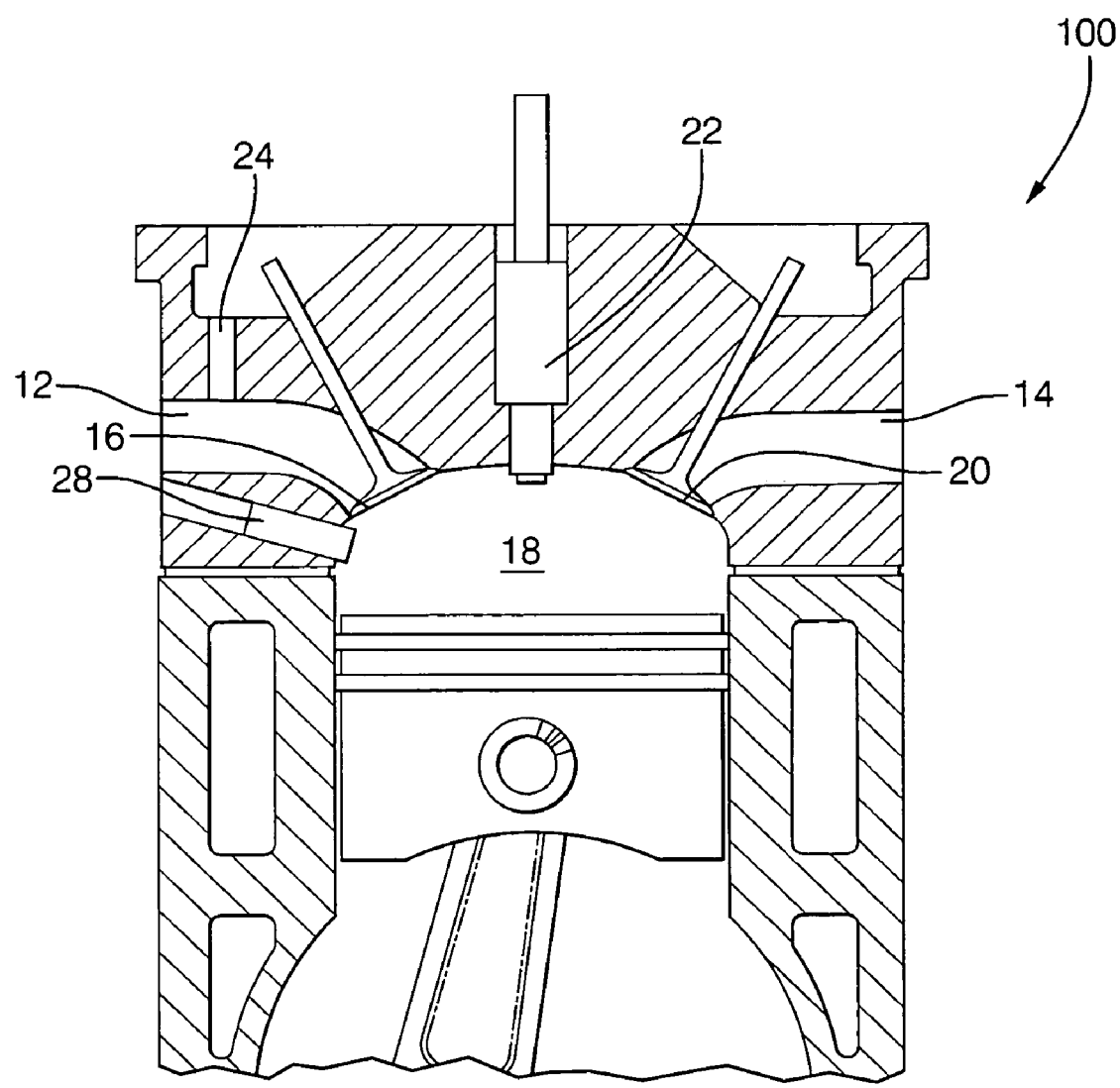
FIG. 1 is a cross-sectional view of a compression ignition engine.

It should first be noted that the terms "first," "second," and the like herein do not denote any order or importance, but rather are used to distinguish one element from another, and the terms "a" and "an" herein do not denote a limitation of quantity, but rather denote the presence of at least one of the referenced items. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.).

The term "on-board" is used herein to refer to the production of a given component within a vehicle system. The term "enriching component" is used throughout this disclosure, including in the claims to generically describe hydrogen ($H_2$), carbon monoxide (CO), or combinations comprising at least one of the foregoing. As will be discussed in much greater detail below, the enriching component can be employed alone or can be employed in combination with a "bulk fuel". While embodiments are envisioned wherein the enriching component can be disposed in a physical mixture with the bulk fuel, it is to be understood that the benefits of using the enriching component can be imparted to the bulk fuel without the enriching component being mixed therewith. The term bulk fuel is used throughout this disclosure merely for convenience in discussion to describe a fuel that is being enriched by the enriching component.

Further, the term "start-up" is used herein to refer to a period of operation of a compression ignition engine beginning with initiating the start of the compression ignition engine (i.e., cranking of the engine) and ending at a point in time where the internal temperature of the engine has stabilized (e.g., the engine has reached its normal coolant temperature). The term "normal operation" thus refers to periods of operation other than start-up.

Disclosed herein is a compression ignition system (engine) and method of operating the system using an ignition device (e.g., a glow plug, and the like) in relation to the enriching component. While it is noted that a compression ignition engine can commonly be referred to as a diesel engine, it is to be understood that fuels other than diesel fuel can be enriched with the enriching component and the compression ignition engine can be adapted to accommodate those fuels (e.g., compression ratio can be varied, and the like). Moreover, it is to be understood that the compression ignition engine can be employed alone or in combination with other power generating devices (e.g., an electric motor (e.g., a hybrid vehicle system), a fuel cell (e.g., a proton exchange membrane (PEM) fuel cell and a solid oxide fuel cell (SOFC)), and the like.

It is noted that one problem with operating a compression ignition engine (e.g., a diesel engine) with a hydrogen- and/or carbon monoxide-enriched fuel is that the gaseous fuels (hydrogen and carbon monoxide) can have a different ignition delay than, for example, diesel fuel. Thus, it is conceivable and likely that the diesel fuel can auto-ignite more readily before the hydrogen- and/or the carbon monoxide reach their respective auto-ignition temperatures, thereby mitigating/eliminating the desired effects of adding hydrogen- and/or carbon monoxide to the fuel.

As will be explained in much greater detail below, it has been discovered that by employing an ignition device (e.g., a glow plug) during normal operation of a compression ignition engine that thermal energy can be released from the enriching component prior to the bulk fuel during a given engine cycle, thereby allowing the bulk fuel to burn in a much more homogenous manner than it would burn without the enriching component. Without being bound by theory, this method of operation can increase fuel efficiency of the compression ignition engine, while reducing undesirable emissions.

Suitable fuels ("bulk fuels") that can be enriched with the enriching component, include, but are not limited to, hydrocarbon fuels such as gasoline, diesel, ethanol, methanol, kerosene, and the like; gaseous fuels, such as natural gas (e.g., methane), propane, butane, and the like; and alternative fuels, such as biofuels, dimethyl ether, and the like; as well as combinations comprising at least one of the foregoing fuels. The selection of the fuel can be based upon application, expense, availability, and environmental issues relating to the fuel. Examples of diesel fuels can include commercial diesel fuels, military diesel fuels, blended diesel fuels containing a larger than normal "light end" component (e.g., diesel blended with naphtha, gasoline, kerosene, and/or methanol), and the like, as well as combinations comprising at least one of the foregoing diesel fuels.

The enriching component employed in enriching the above-described fuel(s) can be stored on-board a vehicle system, produced on demand (e.g., with a fuel reformer (which can also be referred to as a fuel processor)), and the like. In an embodiment, the enriching component can be made using an on-board reformer, which can advantageously allow the enriching component to be produced on demand within the vehicle system. For example, a fuel (e.g., those fuels discussed above in relation to the "bulk fuel", and the like) can be introduced into a reformer, wherein the fuel can be converted to the enriching component. More particularly, reforming can comprise mixing a fuel with an oxygen source (e.g., air, exhaust gas recycle (EGR), and the like), and converting the fuel into, for example, hydrogen ($H_2$), and carbon monoxide (CO), along with other byproducts (e.g., methane ($CH_4$), inert materials (e.g., nitrogen ($N_2$), carbon dioxide ($CO_2$), and water ($H_2O$)), and the like. The fuel can be converted catalytically or via other sources such as plasma devices. Possible approaches include steam reforming, partial oxidation, and dry reforming.

Steam reforming involves the use of a fuel and steam ($H_2O$) that can be reacted in heated tubes filled with a catalyst(s) to convert the hydrocarbons into synthesis gas (i.e., a gas comprising principally hydrogen and carbon monoxide). The steam reforming reactions are endothermic, thus the steam reformers can be designed to transfer heat into the catalytic process. An example of the steam reforming reaction is as follows:

$$CH_4 + H_2O \rightarrow CO + 3H_2$$

Partial oxidation reformers are based on substoichiometric combustion to achieve the temperatures sufficient to reform the fuel. Chemical "decomposition" of the fuel to synthesis gas can occur through thermal reactions at high temperatures, e.g., about 700° C. to about 1,000° C. Catalysts have been demonstrated with partial oxidation systems (catalytic partial oxidation) to promote conversion of various fuels into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2$$

Dry reforming involves the creation of synthesis gas in the absence of water, for example, using carbon dioxide as the oxidant. Dry reforming reactions, like steam reforming reactions, are endothermic processes. An example of the dry reforming reaction is depicted in the following reaction:

$$CH_4 + CO_2 \rightarrow 2CO + 2H_2$$

Practical reformers can comprise a combination of these idealized processes. Thus, a combination of air, water, and/or recycled exhaust fluid can be used as the oxidant in the fuel reforming process While reformate is one possible source of the enriching component, it is to be understood that the enriching component can be made by any suitable method. Having produced the enriching component, it can then be directly-injected into a combustion chamber of a compression ignition system, manifold-injected (e.g., injected into an enriching component port 24 (FIG. 1)), and the like.

Referring now to FIG. 1, an exemplary compression ignition engine, generally designated 100 is illustrated. The compression ignition engine 100 can comprise an intake port 12 and an exhaust port 14, wherein the intake port 12 can be in fluid communication with an oxygen (air) source and the exhaust port 14 can be in fluid communication with an exhaust conduit. More particularly, an intake valve 16 can allow an oxygen source (e.g., air, exhaust gas recycle (EGR) diluents, and the like) to be directed into a combustion chamber 18 via intake port 12. Similarly, an exhaust valve 20 can allow exhaust to exit the combustion chamber 18 via exhaust port 14. Bulk fuel (e.g., diesel fuel) and/or enriching component can be injected into the combustion chamber 18 via injector 22. Additionally/alternatively, enriching component can be injected into the combustion chamber 18 via enriching component port 24. In various other embodiments, an additional injector (not shown) can be employed to dispose the enriching component in the combustion chamber 18.

An ignition device 28 can be disposed in thermal communication with the combustion chamber 18. More particularly, the ignition device 28 can be selected and positioned relative to the combustion chamber 18 such that when the enriching component is added during an engine cycle the ignition device 28 can aid in releasing thermal energy from the enriching component prior to energy being released from the bulk fuel. Suitable ignition devices can include a glow plug, a spark plug, and the like. Without being bound by theory, advantages can be realized when the ignition device 28 is a glow plug, since a glow plug can be a standard feature in an automotive compression (diesel) engine and can be an optional feature on many other compression ignition engines. As such, by employing a glow plug as the ignition device 28, the control system may not have to be modified compared to using a spark plug. The ignition device 28 is discussed hereinafter in relation to a glow plug merely for ease in discussion. It is to be understood that one of skill in the art could readily adapt the compression engine control system for use with other ignition devices (e.g., a spark plug).

As noted above, in an embodiment the ignition device 28 can be a glow plug. The glow plug can comprise any device capable of converting electrical energy into thermal energy. More particularly, the glow plug can comprise a resistance heater disposed on a substrate, which can be disposed in a shell. The shell can further comprise a threaded portion, which can be used to fix the glow plug to a wall of the combustion chamber. The size, shape, location, and the like, of the glow plug can vary, for example, with the size of the compression engine, with the type of fuel employed in the compression ignition engine, and the like.

Enriching component port 24 can be disposed in fluid communication with an enriching component source (not shown). For example, enriching component port 24 can be disposed in fluid communication with a reformate stream of a reformer. The reformate stream of the reformer generally can comprise synthesis gas, which can be directed to the combustion chamber 18 via, for example, enriching component port 24. It is briefly noted that as a hydrogen distribution infrastructure and practical means of storing hydrogen on broad a vehicle system develop, it may be advantageous (e.g., cost effective) to obtain the hydrogen from a distribution location rather than produce hydrogen on-board a vehicle system as an enriching component.

In a first mode of operation (e.g., during engine start-up, idle, and under low engine loads), the compression ignition engine can be supplied with substantially only enriching component (e.g., no bulk fuel is added to the combustion chamber 18). For example, enriching component can be supplied to the combustion chamber 18 in the form of a reformate stream of a reformer. For example, greater than or equal to 90 wt. % reformate, more particularly 100 wt. % reformate, wherein weight percents are based on a total weight of reformate and fuel supplied to the combustion chamber 18, can be supplied to the combustion chamber 18. The use of reformate can allow lower hydrocarbon emissions and $NO_x$ emissions compared to an ignition engine operating with only a bulk fuel (e.g., diesel fuel). Since start-up emissions attribute a significant amount of the total allowed cumulative emissions, this method can advantageously reduce start-up emissions.

During this mode of operation, the enriching component can be auto-ignited and/or the glow plug (ignition device 28) can be used to initiate the release of thermal energy from the enriching component. More particularly, as will be discussed in greater detail with other embodiments, power can be supplied to the glow plug throughout the normal operation of the compression ignition engine 100. More particularly, the power can be supplied to the glow plug at prescribed intervals, at a given exhaust condition (e.g., at a given $NO_x$ concentration), and the like. For example, power can be supplied to the glow plug during a given cycle of the compression ignition engine, repeated over a number of cycles to obtain the desired operating condition (e.g., temperature, and the like), exhaust stream composition, and the like.

During another mode of operation, bulk fuel and enriching component can each be introduced into the combustion chamber 18. The glow plug can be heated to generate a hot-spot in the combustion chamber 18 that can cause the initiation of energy (e.g., thermal energy) release from the enriching component prior to the release of energy from the bulk fuel during a given engine cycle. Without being bound by theory, the rate of heat release of the bulk fuel can be controlled to a much larger degree compared to stratified compression ignition combustion.

In an exemplary embodiment, the enriching component comprises hydrogen and the bulk fuel is diesel fuel. The hydrogen can be pre-mixed with the diesel fuel and directly injected into the combustion chamber 18. Additionally and/or alternatively, the hydrogen can be from reformate (e.g., from an on-board partial oxidation reformer) that can be separately injected directly into the combustion chamber 18 and/or injected into combustion chamber 18 via the enriching component port 24. The ignition device 28 can be a glow plug. During operation, the hydrogen can be introduced into the combustion chamber 18 and its energy released from the heat of the glow plug during, for example, the middle of a compression stroke of the compression ignition engine 100. Diesel fuel can then be added later in the compression stroke of the compression ignition engine 100 and/or early in the power stroke of the compression ignition engine 100. Without being bound by theory, the increase in temperature in the combustion chamber 18 caused by the released thermal energy from the hydrogen can lower the ignition delay for the diesel fuel. As such, it is envisioned that lower cetane fuels and lower compression ratios can be employed compared to systems and methods where an enriching component (hydrogen) is not employed.

Furthermore, it is noted that various other modes of operation are envisioned where the glow plug can be employed with bulk fuel alone, with enriching component alone, or with a combination of bulk fuel and enriching component. When a combination of bulk fuel and enriching component is employed, it is to be understood that bulk fuel and enriching fuel do not always need to be used in combination with each other. For example, in one engine cycle, both bulk fuel and enriching component can be supplied to the combustion chamber 18 and the glow plug can initiate the energy release of the enriching component prior to the bulk fuel during that cycle; in another engine cycle only bulk fuel can be supplied to the combustion chamber 18 with or without supplying power to the glow plug. More particularly, the bulk fuel and the enriching component can be supplied in a manner and in an amount sufficient to meet the desired emission standards and fuel economy standard, which can be attained via the control of the timing, rate, homogeneity, and global parameters of the heat release process.

In various embodiments, the enriching component can be directly-injected into the combustion chamber 18 at the same time as the bulk fuel. Moreover, the enriching component can be injected based upon, for example, the composition of the exhaust exiting the compression ignition engine 100. For example, a gas sensor can be disposed in fluid communication with the exhaust exiting the compression ignition engine 100 to monitor the $NO_x$ emission. A signal from the gas sensor can be relayed to a control system (e.g., computer) to control the flow of enriching component into the combustion chamber 18. More generally, a multi-function algorithm can be used to control the injection parameters of the enriching component.

Additionally, operating the compression ignition engine in the manner disclosed herein can increase fuel efficiency compared to an engine operating more fuel rich. It has been discovered that by using the enriching component in combination with the glow plug, a reduction in hydrocarbon and $NO_x$ emission can be attained compared to a method of operating a compression ignition engine without the glow plug and enriching component.

For comparison, during one mode of operation of a compression ignition engine, an oxygen source (e.g., air) can be compressed and bulk fuel can be introduced to the compressed air. The heat of the compressed air can allow the bulk fuel to combust. Generally, a compression ratio of the compression ignition engine can be about 14:1 to about 30:1. When diesel is the bulk fuel, the compression ratio can be about 14:1 to about 25:1, particularly about 14:1 to about 20:1, and even more particularly about 14:1 to about 18:1. However, it is to be understood that the compression ratio can vary depending, for example, on the type of the bulk fuel. During this mode of operation, a glow plug can be employed during start-up to bring the combustion chamber gases up to self-ignition temperature and thereafter the glow plug can be shut-off (i.e., no power is supplied to the glow plug).

Unlike that mode of operation, the method disclosed herein supplies power to the glow plug not just during start-up, but also throughout normal operation of the compression engine to release thermal energy from the enriching component prior to combustion of the bulk fuel. Without being bound by theory, it is believed that this mode of operation can eliminate the need for various after-treatment devices, more particularly embodiments are envisioned that can eliminate the need for a $NO_x$ absorber. Moreover, by eliminating an exhaust after-treatment device, the overall cost of a vehicle system can advantageously be reduced.

Advantageously, the method of operating a compression ignition engine as described above can increase fuel efficiency, while reducing undesirable emissions. Additionally, the method disclosed herein can be compatible with existing compression ignition engines, thereby allowing a simple cost effective method of reducing undesirable emissions. In short, by using a glow plug, the control system would not have to be modified as a glow plug is a standard feature on automotive diesel engines and can be an optional feature on many other existing compression ignition engines as described above. Nevertheless, as mentioned above, other ignition devices can be used to release the thermal energy of the enriching component to impart the desired benefits discussed throughout this disclosure.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of operating a compression ignition engine, comprising:
   introducing enriching component to a combustion chamber of the compression ignition engine, wherein the enriching component comprises hydrogen, carbon monoxide, or a combination comprising at least one of the foregoing;
   introducing bulk fuel to the combustion chamber;
   heating a glow plug to cause the enriching component to release thermal energy; and
   initiating combustion of the bulk fuel with the released thermal energy from the enriching component.

2. The method of claim 1, further comprising directly-injecting the enriching component into the combustion chamber.

3. The method of claim 1, further comprising injecting the enriching component into an enriching component port of the compression ignition engine.

4. The method of claim 1, further comprising producing reformate by partial oxidation reforming, dry reforming, steam reforming, or a combination comprising at least one of the foregoing, wherein the reformate comprises the enriching component.

5. The method of claim 1, wherein the bulk fuel is selected from the group consisting of gasoline, diesel, ethanol, methanol, kerosene, methane, propane, butane, biofuel, dimethyl ether, and combinations comprising at least one of the foregoing.

6. The method of claim 4, wherein the bulk fuel is diesel.

7. A method of operating a compression ignition engine, comprising:
   producing reformate by partial oxidation reforming, dry reforming, steam reforming, or a combination comprising at least one of the foregoing, wherein the reformate comprises an enriching component comprising hydrogen, carbon monoxide, or a combination comprising at least one of the foregoing
   directly-injecting the enriching component into a combustion chamber of the compression ignition engine;
   directly-injecting a bulk fuel to the combustion chamber;
   releasing thermal energy from the enriching component with an ignition device; and
   initiating combustion of the bulk fuel with the released thermal energy from the enriching component.

8. The method of claim 7, wherein the bulk fuel is selected from the group consisting of gasoline, diesel, ethanol, methanol, kerosene, methane, propane, butane, biofuel, dimethyl ether, and combinations comprising at least one of the foregoing.

9. The method of claim 8, wherein the bulk fuel is diesel.

10. A method of operating a vehicle system, comprising:
    generating reformate in an on-board reformer, wherein the reformate comprises an enriching component, wherein the enriching component comprises hydrogen, carbon monoxide, or a combination comprising at least one of the foregoing;
    introducing the reformate to a combustion chamber of the compression ignition engine;
    introducing bulk fuel to the combustion chamber;
    heating a glow plug to cause the enriching component to release thermal energy; and
    initiating combustion of the bulk fuel with the released thermal energy from the enriching component.

11. The method of claim 10, wherein the vehicle system does not comprise a $NO_x$ adsorber.

12. The method of claim 11, wherein the vehicle system does not comprise any exhaust after treatment devices.

13. The method of claim 10, further comprising directly-injecting the reformate into the combustion chamber.

14. The method of claim 10, further comprising injecting the reformate into an enriching component port of the compression ignition engine.

15. The method of claim 10, wherein generating reformate in an on-board reformer comprises partial oxidation reforming, dry reforming, steam reforming, or a combination comprising at least one of the foregoing.

16. The method of claim 10, wherein the bulk fuel is selected from the group consisting of gasoline, diesel, ethanol, methanol, kerosene, methane, propane, butane, biofuel, dimethyl ether, and combinations comprising at least one of the foregoing.

17. The method of claim 16, wherein the bulk fuel is diesel.

* * * * *